United States Patent [19]
Kitaoka et al.

[11] Patent Number: 6,003,999
[45] Date of Patent: Dec. 21, 1999

[54] MIRROR RECOIL PREVENTING DEVICE

[75] Inventors: Naoki Kitaoka, Tokyo; Kosho Miura, Kamakura, both of Japan

[73] Assignee: Nikon Corporation, Tokyo, Japan

[21] Appl. No.: 08/835,098

[22] Filed: Apr. 4, 1997

Related U.S. Application Data

[60] Provisional application No. 60/037,949, Feb. 20, 1997.

[30] Foreign Application Priority Data

Apr. 4, 1996 [JP] Japan ..................................... 8-108411

[51] Int. Cl.⁶ .................................................. G02B 7/182
[52] U.S. Cl. .......................... 359/872; 359/873; 359/874; 359/875; 359/877; 396/73; 396/358; 396/356
[58] Field of Search ...................................... 359/872, 873, 359/874, 875, 877; 396/73, 117, 385, 478, 358, 356

*Primary Examiner*—Cassandra Spyrou
*Assistant Examiner*—Mohammad Y. Sikder

[57] ABSTRACT

A mirror recoil preventing device suitable for a camera has a mirror and a mirror support frame. The mirror support frame movably supports the mirror in movement from a first position to a second position. In a camera having a photographic lens and a range finding element, the mirror guides light from the photographic lens to the range finding element when positioned at the second position. As a first alternative, the mirror support frame has a U-shaped groove at one end thereof. A regulating member is located in the vicinity of the second position to engage with the U-shaped groove when the mirror support frame is at the second position. As a second alternative, the mirror support frame has a leading edge and a trailing edge such that in movement from the first position to the second position, the trailing edge trails the leading edge. A first regulating member is located to be immediately adjacent to the leading edge of the mirror support frame when the mirror support frame is at the second position. A second regulating member is located to be immediately adjacent to the leading edge of the mirror support frame when the mirror support frame is at the second position.

4 Claims, 9 Drawing Sheets

MIRROR RECOIL PREVENTING DEVICE

CROSS REFERENCE TO RELATED APPLICATIONS

This application is based upon and claims priority to Japanese Patent Application No. 8-108411, filed Apr. 4, 1996, the contents of which are incorporated herein by reference. This application also claims the benefit of the provisional application filed Feb. 20, 1997 entitled A MIRROR BOUND PREVENTION DEVICE having a Serial No. 60/037949.

BACKGROUND OF THE INVENTION

1. Field of the Invention

The preferred embodiments of the present invention relate in general to a device which prevents mirror recoil. More specifically, the preferred embodiments of the present invention relate to a device which prevents mirror recoil in a photographic device such as a camera when a quick return type mirror is lowered.

2. Description of the Related Art

FIG. 11 is a cross sectional diagram of a conventional single lens reflex camera. A light ray 102, entering from a lens 101 mounted in a camera body 100, is reflected upward by a main mirror 1, and is guided to an eyepiece lens 104. The main mirror 1 has a semi-transparent portion, and a portion 102a of the light ray 102 passes through the semi-transparent portion of the main mirror, is reflected by a sub-mirror 2 and guided to a rangefinding element 103 in a lower portion of the camera body.

The main mirror 1 is fixed in a main mirror support frame 202. The main mirror support frame 202 has a hole 205 and is rotatably, axially supported with a rotary shaft fixed to the camera body 100. A shaft 206 and pins 207 and 208 are fixed to the main mirror support frame 202.

A pin 219 is fixed to the camera body 100. The pin 219 can engage with a U-shaped groove of the sub-mirror support frame 212. However, the pin 219 does not engage with the U-shaped groove of the sub-mirror support frame 212 in the position shown in FIG. 11. Eccentric pins 220 and 222 are mounted, and are capable of rotary adjustment, in the camera body 100. The sub-mirror 2 is fixed in a sub-mirror support frame 212. The sub-mirror support frame 212 is axially supported and rotatable around a shaft 206. A pin 215 is fixed to the sub-mirror support frame 212. A toggle spring 216 is suspended between pins 215 and 207 to urge the sub-mirror support frame 212 toward the eccentric pin 220. A mirror return spring 230 is suspended on the pin 208 and a pin 209 fixed to the camera 100 body, and urges the main mirror support frame 202 toward the eccentric pin 222.

Next, the operation of a conventional mirror return device will be described. When an exposure is completed by a well known method, the main mirror support frame 202 moves counter-clockwise around the hole 205 by the action of the mirror return spring 230. The main mirror support frame 202 thus returns to the position shown in FIG. 11. Then the sub-mirror support frame 212 and the eccentric pin 220 collide, and the main mirror support frame 202 and the eccentric pin 222 collide.

In the conventional device, when the sub-mirror support frame 212 and the eccentric pin 220 collide, the sub-mirror support frame 212 recoils in a counter-clockwise direction due to the impact. This recoil alters the direction and path length of portion 102a of light ray 102 travelling toward the rangefinder element 103. Thus, during recoil of the sub-mirror support frame 212, accurate rangefinding is not performed. Accurate rangefinding must be delayed until after cessation of the recoil. In autofocus mode, during tracking of a subject in continuous photography, the delay limits the number of photographs per unit time.

SUMMARY OF THE INVENTION

Accordingly, it is an object of the preferred embodiments of the present invention to expedite accurate rangefinding in a photographic device after an exposure is completed.

It is a further object of the preferred embodiments of the present invention to shortened the recoil time of a sub-mirror support frame after the sub-mirror support frame is lowered in a photographic device.

It is a still further object of the preferred embodiments of the present invention to increase the possible number of photographs per unit time in continuous photography while tracking a subject with a camera in autofocus.

Additional objects and advantages of the preferred embodiments of the invention will be set forth in part in the description which follows, and, in part, will be obvious from the description, or may learned by practice of the preferred embodiments.

According to a first preferred embodiment of the invention, a mirror recoil preventing device has a mirror, a mirror support frame and a regulating member. The mirror support frame movably supports the mirror to support the mirror in movement from a first position to a second position. The mirror support frame has a U-shaped groove at one end thereof. The regulating member is located in the vicinity of the second position to engage with the U-shaped groove when the mirror support frame is at the second position.

According to a second preferred embodiment of the invention, a mirror recoil preventing device, has a mirror, a mirror support frame and first and second regulating members. The mirror support frame movably supports the mirror to support the mirror in movement from a first position to a second position. The mirror support frame has a leading edge and a trailing edge such that in movement from the first position to the second position, the trailing edge trails the leading edge. The first regulating member is located to be immediately adjacent to the leading edge of the mirror support frame when the mirror support frame is at the second position. The second regulating member is located to be immediately adjacent to the leading edge of the mirror support frame when the mirror support frame is at the second position.

BRIEF DESCRIPTIONS OF THE DRAWINGS

These and other objects and advantages of the invention will become apparent and more readily appreciated from the following description of the preferred embodiments taken in conjunction with the accompanying drawings of which:

DETAILED DESCRIPTION OF THE PREFERRED EMBODIMENTS

Figure 1:
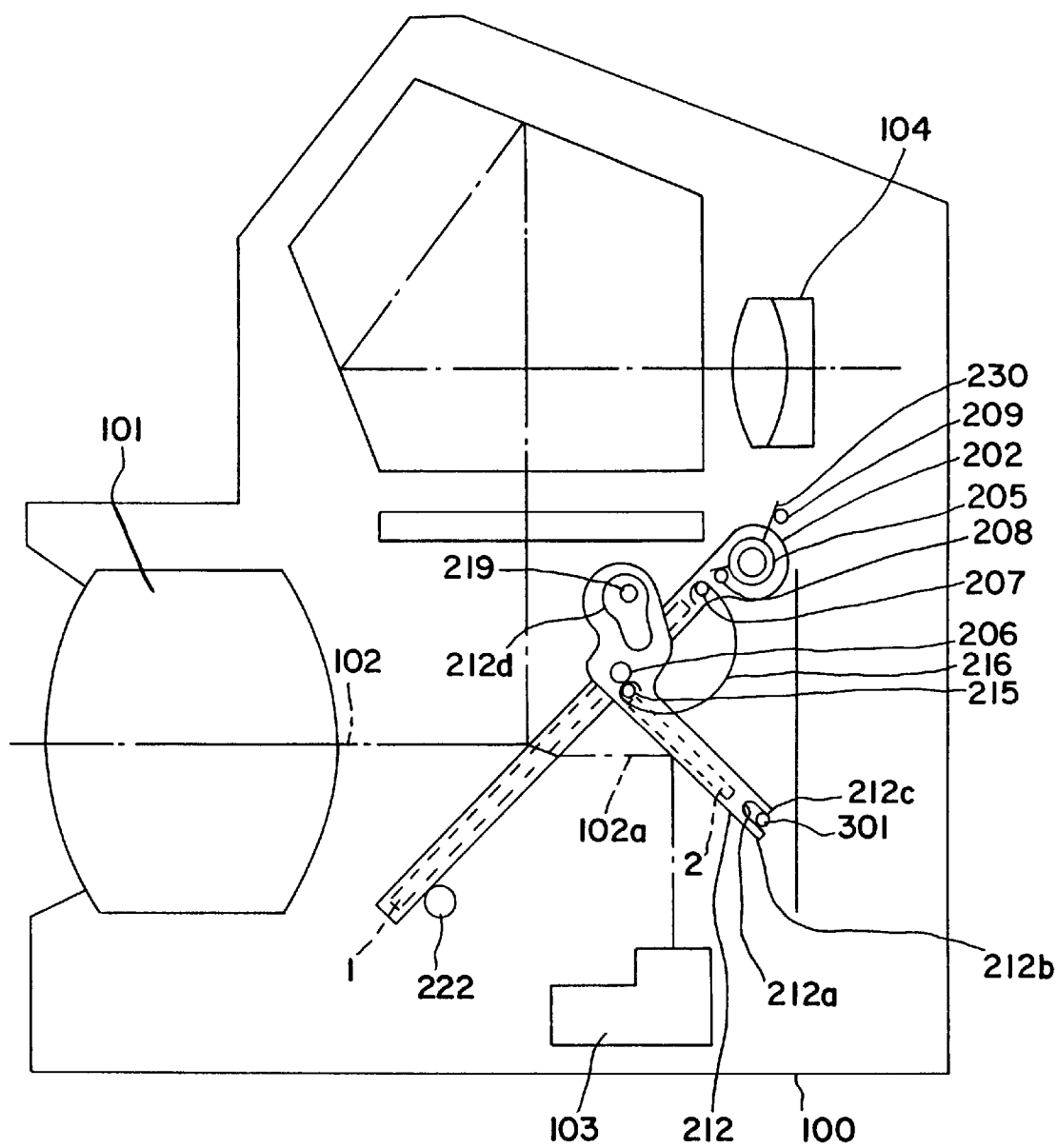
FIG. 1 is a cross-sectional diagram showing a first preferred embodiment of a mirror recoil preventing device according to the present invention, as adapted to a camera.

Reference will now be made in detail to the present preferred embodiments of the present invention, examples of which are illustrated in the accompanying drawings, wherein like reference numerals refer to like elements throughout.

FIG. 1 is a cross sectional diagram showing a first preferred embodiment of a mirror recoil preventing device according to the present invention as adapted to a photographic device, namely a camera.

In FIG. 1, a light ray 102 entering from a lens 101 mounted in a camera body 100 is reflected upward by a main mirror 1 and guided to an objective lens (eyepiece lens 104). The main mirror 1 has a semi-transparent portion, and a portion 102a of the light ray 102 passes through the semi-transparent portion of the main mirror, and is reflected by a sub-mirror 2 and guided to a rangefinding element 103.

The main mirror 1 is fixed in a main mirror support frame 202. The main mirror support frame 202 has a hole 205, and is rotatably, axially supported with a rotary shaft fixed to the camera body 100. A shaft 206 and pins 207 and 208 are fixed to the main mirror support frame 202.

A pin 219 is fixed to the camera body 100. An eccentric pin 222 is mounted and capable of rotary adjustment in the camera body 100. The sub-mirror 2 is fixed in a sub-mirror support frame 212. The sub-mirror support frame 212 is axially supported and rotatable around a shaft 206. The sub-mirror support frame 212 has a cam shape 212d and a U-shaped groove 212a at a tip thereof. A catch pin 301 fits in the U-shaped groove 212a. The U-shaped groove 212a has ends 212b and 212c. A pin 215 is fixed to the sub-mirror support frame 212. A toggle spring 216 is suspended between the pin 215 and the pin 207, and in the photographic standby state shown in FIG. 1, urges the sub-mirror support frame 212 counter-clockwise toward the catch pin 301. A mirror return spring 230 is suspended on pin 208 and a pin 209 fixed to the camera body 100, and urges the main mirror support frame 202 counter-clockwise toward the eccentric pin 222.

Next, the operation of the first preferred embodiment of the present invention will be described. When an exposure is completed by a well known method, the main mirror support frame 202 moves counter-clockwise around the hole 205 by the action of the mirror return spring 230. Then the sub-mirror support frame 212 also returns to the position shown in FIG. 1 to guide portion 102a of light ray 102 toward the rangefinding element 103. As the sub-mirror support frame 212 returns, catch pin 301 fits into the U-shaped groove 212a at the tip of the sub-mirror support frame 212. After the main mirror support frame 202 and the eccentric pin 222 collide, both the main mirror 1 and the sub-mirror 2 are returned to the normal photographic standby state.

Figure 2:
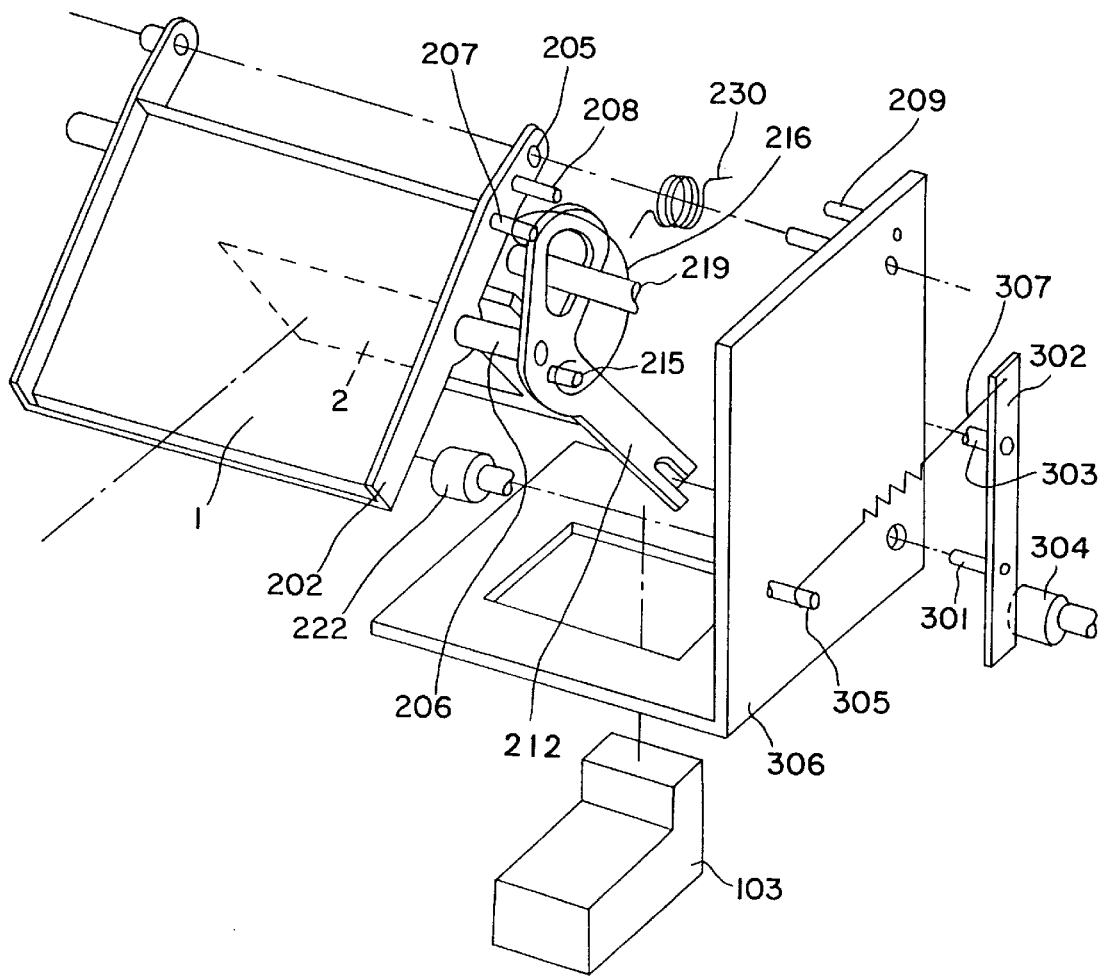
FIG. 2 is an perspective view of mirrors and related mechanisms for the mirror recoil preventing device shown in FIG. 1.

FIG. 2 is a perspective view of mirrors and related mechanisms for the mirror recoil preventing device shown in FIG. 1. The catch pin 301 is fixed in a catch lever 302. The catch lever 302 is mounted to be capable of rotation around a shaft 303 which is fixed to the camera body (not shown in FIG. 2). The catch lever 302 has a spring 307 suspended at one end thereof. The other end of the spring 307 is connected to a pin 305 mounted to a frame 306. Spring 307 urges catch lever 302 toward an eccentric pin 304 which is rotatably mounted on the camera body (not shown in FIG. 2).

When the eccentric pin 304 rotates, the position of the catch lever 302 and the catch pin 301 changes, centered on the shaft 303. In this manner, it is possible to adjust the angle of the optical axis of portion 102a (see FIG. 1) with respect to the sub-mirror support frame 212 (catch pin 301 fits into sub-mirror support frame 212).

Figure 3:
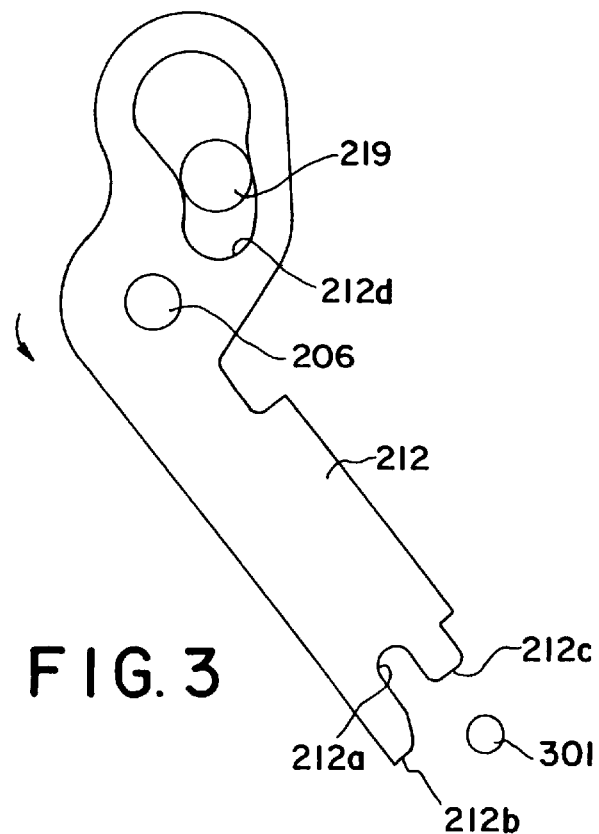
FIG. 3 is a cross-sectional diagram showing a sub-mirror support frame of FIG. 1 at an initial stage of travel to a photographic standby state.
Figure 4:
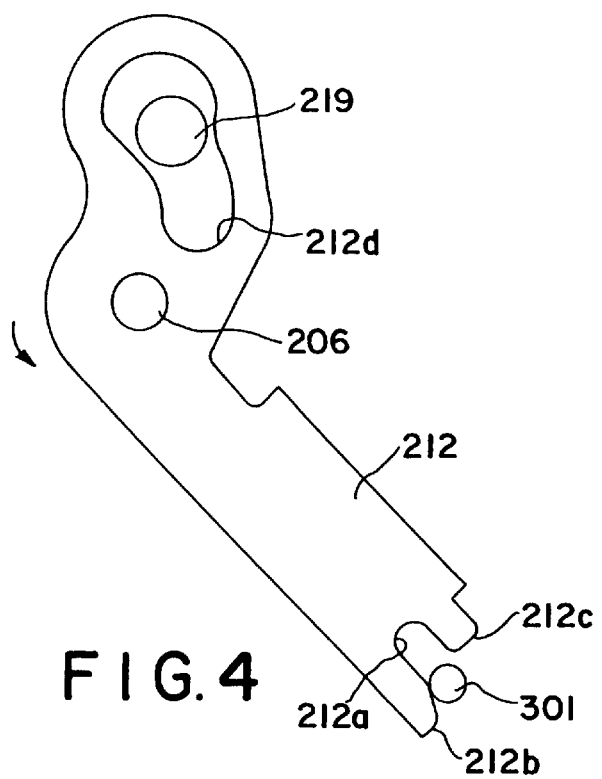
FIG. 4 is a cross-sectional diagram, showing the sub-mirror support frame of FIG. 1 at an intermediate stage of travel to the photographic standby state.
Figure 5:
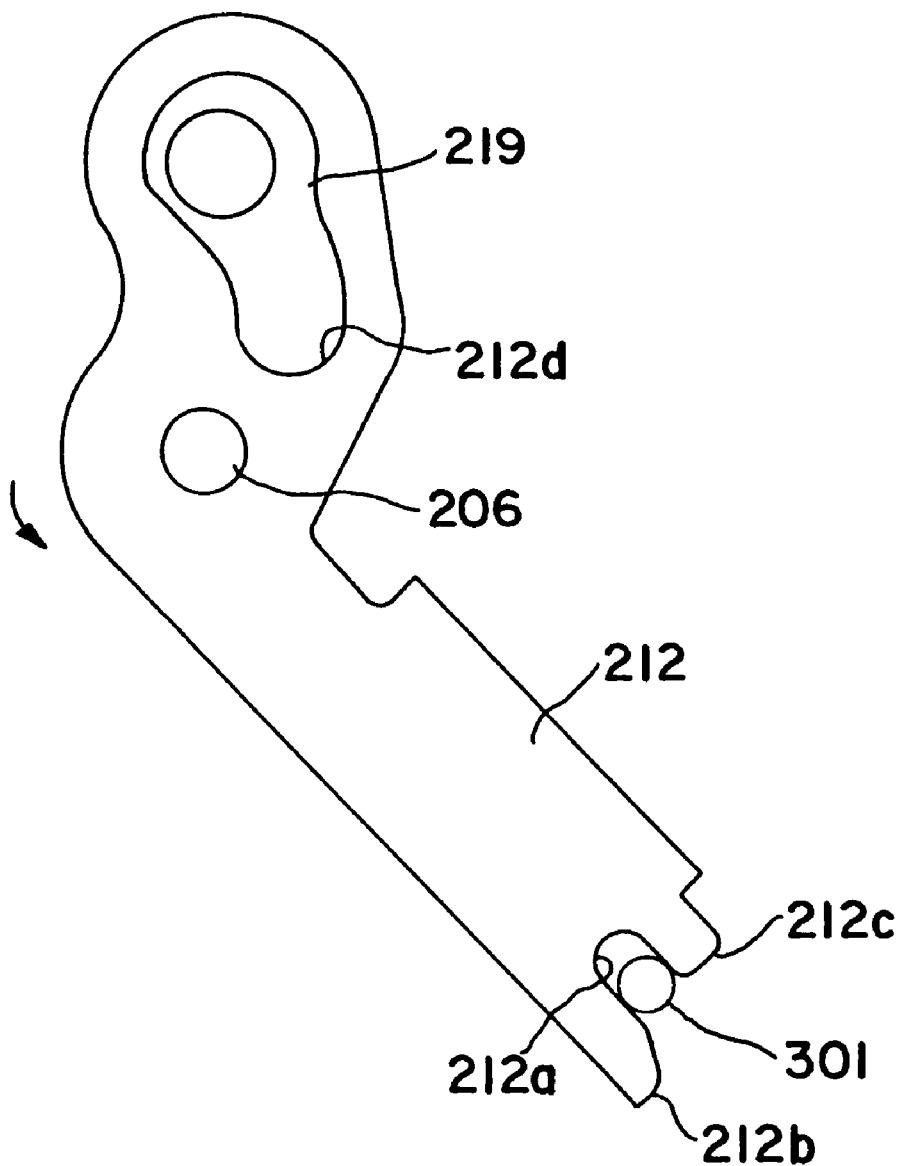
FIG. 5 is a cross-sectional diagram, showing the sub-mirror support frame of FIG. 1 at a final stage of travel to the photographic standby state.

FIGS. 3–5 show the sub-mirror support frame 212 at various stages of travel from an exposure state to a photographic standby state after the end of photographic exposure. FIG. 3 shows an initial stage of travel. FIG. 4 shows an intermediate stage of travel. FIG. 5 shows a final stage, when completely returned.

Pin 219 functions as a guide member that guides a movement locus within the cam shape 212d. When the sub-mirror support frame 212 moves from a mirror-up position to a mirror-down position, the pin 219 engages with an upper portion of cam shape 212d as can be seen by comparing FIGS. 3–5. The movement locus within the cam shape 212d is determined by the engagement position between the pin 219 and the cam shape 212d. With the changing engagement position, the catch pin 301 is received into the U-shaped groove 212a of the sub-mirror support frame 212.

As shown in FIGS. 3–5, the U-shaped groove 212a of the sub-mirror support frame 212 has two ends 212b and 212c. The end 212c has a shape which does not interfere with the catch pin 301 during return travel of the sub-mirror. In FIGS. 3–5, it is apparent that the U-shaped groove 212a is widened toward the tip of end 212b. During movement of the sub-mirror support frame 212 from the mirror-up position to the mirror-down position, the end 212c is a leading edge of the U-shaped groove 212a and the end 212b is a trailing edge of the U-shaped groove 212a. The trailing edge 212b extends further from the sub-mirror support frame 212 than the leading edge 212c such that the depth of the U-shaped groove 212a is greater at the trailing edge 212b than at the leading edge 212c.

The cam shape 212d, even when there is no urging force of the toggle spring 216, ensures that the end 212c does not hit catch pin 301 (does not interfere with travel from the exposure state). Cam shape 212d has a shape to sufficiently engage the U-shaped groove 212a after travel.

Figure 6:
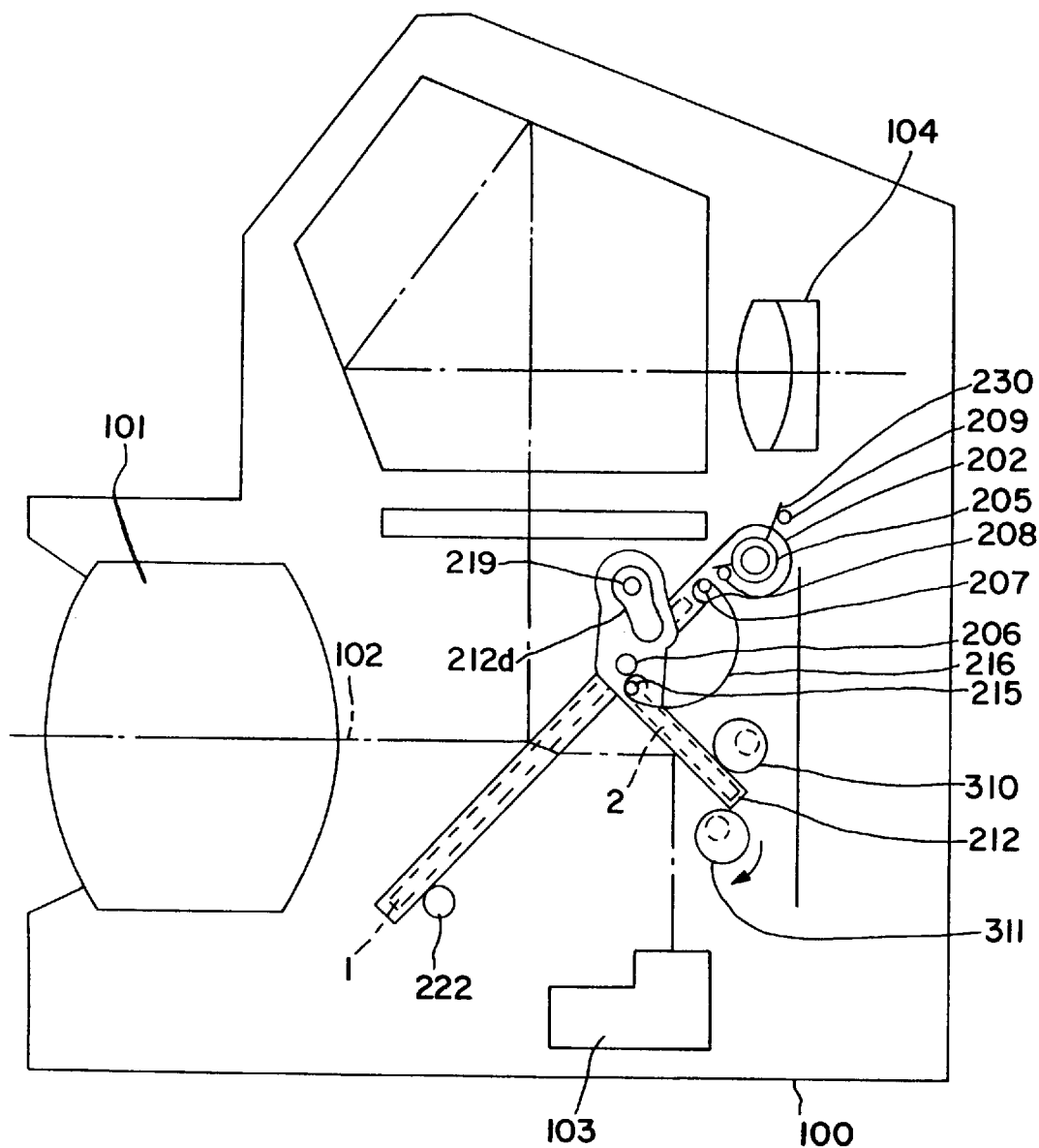
FIG. 6 is a cross-sectional diagram showing a second preferred embodiment of a mirror recoil preventing device according to the present invention.
Figure 7:
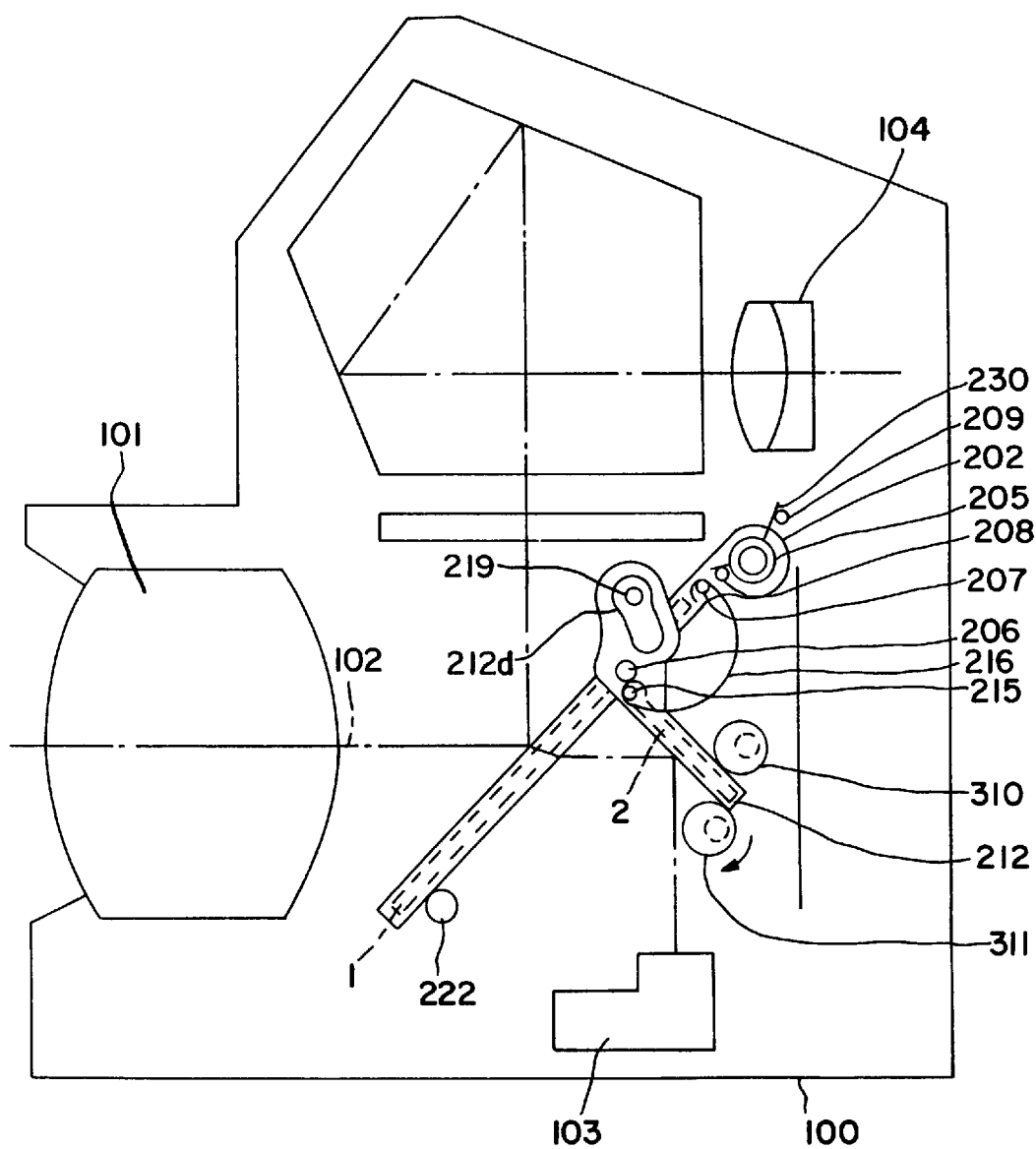
FIG. 7 is a cross-sectional diagram showing the second preferred embodiment of FIG. 6 after rotation of an eccentric pin.

FIG. 6 is a cross sectional diagram showing a second preferred embodiment of the present invention. As shown in FIG. 6, the toggle spring 216 is suspended between the pin 215 and the pin 207, and in the photographic standby state, urges the sub-mirror support frame 212 counter-clockwise toward an eccentric pin 310. By causing the eccentric pin 310 to rotate, it is possible to adjust the optical axis angle of the sub-mirror support frame 212. After the angular adjustment of the sub-mirror support frame 212, an eccentric pin 311, as shown in FIG. 7, contacts a surface of the sub-mirror support frame 212 opposite the surface which the eccentric pin 310 contacts (to perhaps rotationally adjust the angle of the sub-mirror support frame 212 to a very close position).

Figure 8:
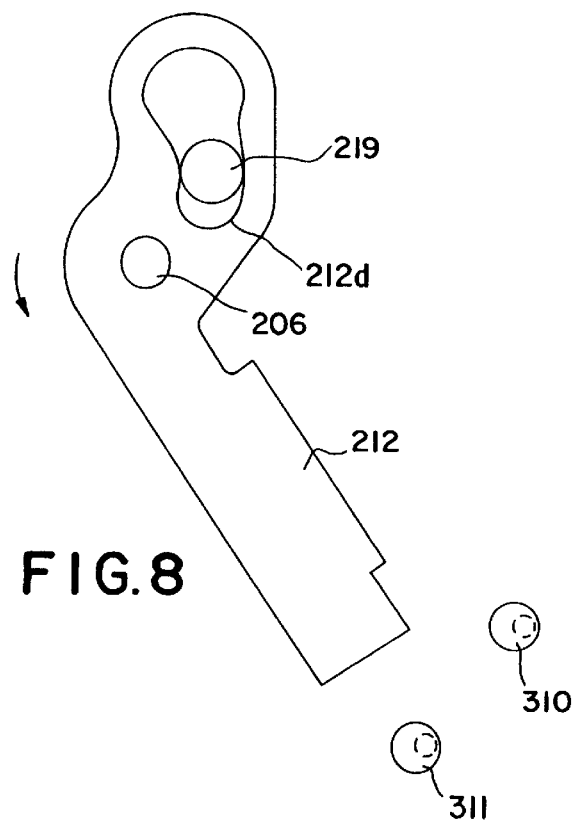
FIG. 8 is a cross-sectional diagram, showing a sub-mirror support frame of FIG. 6 at an initial stage of travel to a photographic standby state.
Figure 9:
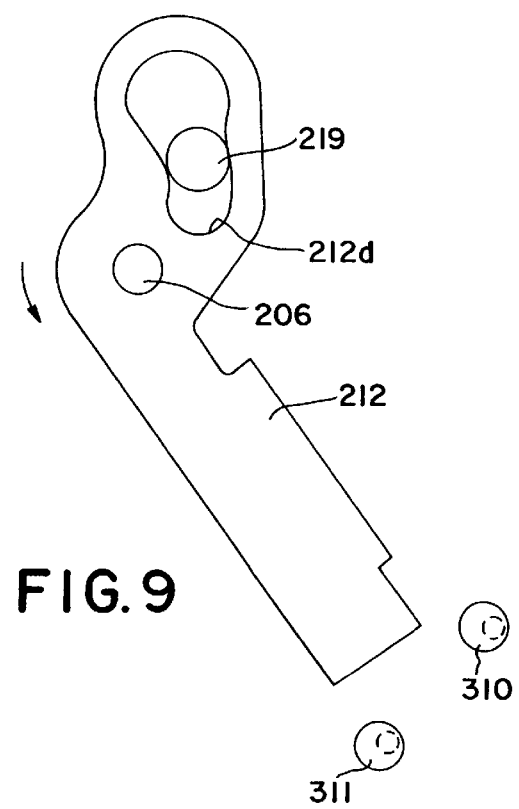
FIG. 9 is a cross-sectional diagram, showing the sub-mirror support frame of FIG. 6 at an intermediate stage of travel to the photographic standby state.
Figure 10:
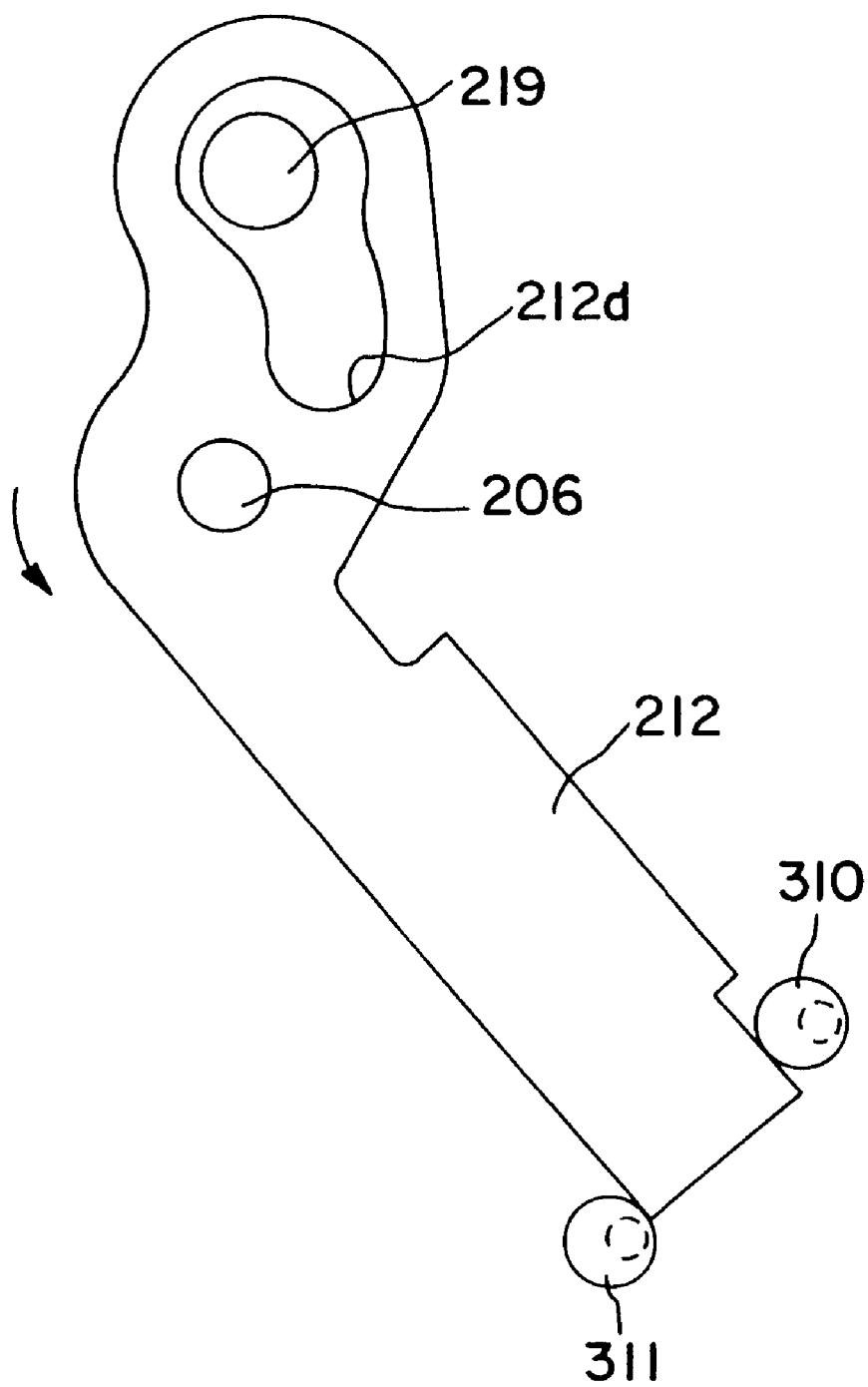
FIG. 10 is a cross-sectional diagram, showing the sub-mirror support frame of FIG. 6 at a final stage of travel to the photographic standby state.

FIGS. 8–10 show the sub-mirror support frame 212 at various stages of travel from the exposure state to a photographic standby state after the end of photographic exposure. FIG. 8 shows an initial stage of travel. FIG. 9 shows an intermediate stage of travel. FIG. 10 shows the sub-mirror support frame at a final stage, when the sub-mirror support frame has completely returned to the photographic standby state. As shown in FIGS. 8–10 in the course of return travel of the sub-mirror support frame 212, until the sub-mirror support frame 212 collides with the eccentric pin 310, the sub-mirror support frame 212 does not touch the eccentric pin 311. Moreover, the cam shape 212d of the sub-mirror support frame 212, even without the urging force of toggle spring 216, ensures that the sub-mirror support frame 212 does not touch eccentric pin 311 until the sub-mirror support frame 212 collides with the eccentric pin 310.

The pin 219 functions as a guide member that guides a movement locus within the cam shape 212d. When the sub-mirror support frame 212 moves from a mirror-up position to a mirror-down position, the pin 219 moves to engage with an upper portion of the cam shape 212d, as can be seen by comparing FIGS. 8–10. The movement locus within the cam shape 212d is determined by the engagement position between the pin 219 and the cam shape 212d. With a changing engagement position, one end of the sub-mirror support frame 212 is received between the eccentric pin 310 and the eccentric pin 311.

Figure 11:
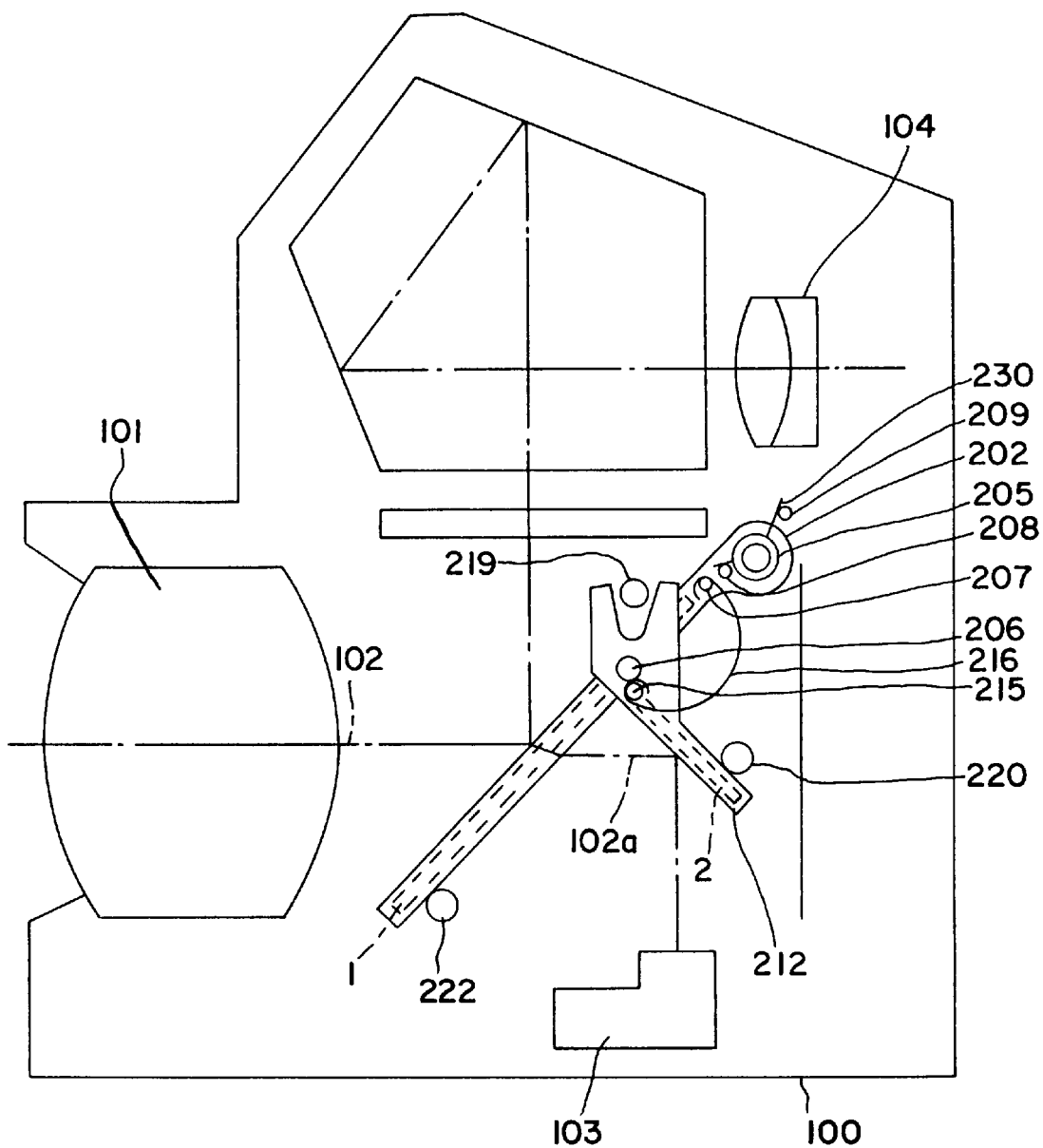
FIG. 11 is a cross-sectional view of a conventional single lens reflex camera.

In the first preferred embodiment, while the sub-mirror support frame 212 returns to the photographic standby state after the completion of photographic exposure, the U-shaped groove 212a of the sub-mirror support frame 212 engages with the catch pin 301. By suppressing recoil occurring from a collision at the time of return, it is possible to initiate rangefinding earlier in the autofocus mode. It is also possible to increase the number of photographs per unit time in continuous photography while tracking a subject. With the cam shaped 212d, even when there is no urging force from toggle spring 216, catch pin 301 can engage with U-shaped groove 212a without end 212c interfering with engagement. Management of the spring force of the toggle spring 216 becomes unnecessary, cost is reduced, and the design is simplified. Moreover, referring to the conventional device (FIG. 11), in the first preferred embodiment of the present invention, the shape of the sub-mirror support frame 212 is redesigned, and only a few components (302–305, 307: five components in all) are added to the conventional device. Thus, the first preferred embodiment can prevent mirror rebound, which prevention could not be attained in the conventional device (FIG. 11). Moreover, because only a few components are added to the conventional device (FIG. 11), very little, if any, increase in camera volume is necessary to accommodate these components. Furthermore, because the opening of the U-shaped groove 212a at the end 212b is widened (enlarged toward a U-shaped outlet), it is possible for the U-shaped groove 212a to engage smoothly and accurately with the catch pin 301.

Accordingly to the second preferred embodiment, the sub-mirror support frame 212 enters between eccentric pins 310 and 311 to suppress any recoil occurring after collision. It is therefore possible to expedite when autofocus rangefinding can begin after photographic exposure. It is possible to increase the number of photographs per unit time in continuous photography while tracking a subject. Moreover, with the cam shape 212d, even when there is no urging force of the toggle spring 216, the eccentric pin 311 does not contact sub-mirror support frame 212 during movement thereof. Hence, management of the spring force of the toggle spring 216 is unnecessary, cost is reduced, and the operation of the device can be simplified. Moreover, referring to the conventional device (FIG. 11), in the second preferred embodiment of the present invention, only one component (element 311 shown in FIGS. 6–10) is added to the conventional device. Thus, the second preferred embodiment can prevent mere rebound, which prevention could not be attained in the conventional device (FIG. 11). Moreover, according to the second preferred embodiment, it is not necessary to add numerous additional components to achieve this goal. Accordingly, very little, if any, increase in camera volume is necessary to accommodate additional components.

Although a few of the preferred embodiments have been shown and described, it would be appreciated by those skilled in the art that changes may be made in these embodiments without departing from the principles and spirit of the invention, the scope of which is defined in the claims and their equivalents.

For example, in the first preferred embodiment, the U-shaped groove 212a is described as being formed in the sub-mirror support frame 212, and the catch pin 301 is described as being fixed to the camera body, but the catch pin 301 may be disposed in the sub-mirror support frame 212, and the U-shaped groove 212a may be fixed to the camera body.

As another example, in the second preferred embodiment, two eccentric pins 310 and 311 were described, but two rollers may be used instead. Furthermore, three or more rollers may replace eccentric pins 310 and 311.

What is claimed is:

1. A mirror recoil preventing device, comprising:

a mirror;

a mirror support frame to movably support the mirror in movement from a first position to a second position, the mirror support frame having a groove at one end thereof; and a regulating member, located in the vicinity of the second position, to engage with the groove when the mirror support frame is at the second position, wherein the mirror support frame has first and second ends, the mirror support frame rotates about the first end, and the groove is provided at the second end.

2. A mirror recoil preventing device, comprising:

a mirror;

a mirror support frame to movably support the mirror in movement from a first position to a second position, the mirror support frame having a groove at one end thereof;

a regulating member, located in the vicinity of the second position, to engage with the groove when the mirror support frame is at the second position; and a defining member which defines a locus of movement of the mirror support frame such that the groove of the mirror support frame and the regulating member engage at the second position, wherein the defining member is a cam groove provided in the mirror support frame.

3. A mirror recoil preventing device, comprising:

a mirror;

a mirror support frame to movably support the mirror in movement from a first position to a second position, the mirror support frame having a leading edge and a trailing edge such that in movement from the first position to the second position, the trailing edge trails the leading edge;

a first regulating member located to be immediately adjacent to the leading edge of the mirror support frame when the mirror support frame is at the second position; and a second regulating member located to be immediately adjacent to the trailing edge of the mirror support frame when the mirror support frame is at the second position, wherein the mirror support frame has first and second ends, the mirror support frame rotates about the first end, and the first and second regulating members are located immediately adjacent to the second end of the mirror support frame when the mirror support frame is at the second position.

4. A mirror recoil preventing device, comprising:

a mirror;

a mirror support frame to movably support the mirror in movement from a first position to a second position, the mirror support frame having a leading edge and a trailing edge such that in movement from the first position to the second position, the trailing edge trails the leading edge;

a first regulating member located to be immediately adjacent to the leading edge of the mirror support frame when the mirror support frame is at the second position;

a second regulating member located to be immediately adjacent to the trailing edge of the mirror support frame when the mirror support frame is at the second position; and a defining member which defines a locus of movement of the mirror support frame such that the first and second regulating members become immediately adjacent to the mirror support frame when the mirror support frame is moved to the second position, wherein the defining member is a cam groove provided in the mirror support frame.

* * * * *